United States Patent
Liang

(10) Patent No.: US 6,633,155 B1
(45) Date of Patent: Oct. 14, 2003

(54) WIRELESS MOUSE INDUCTION POWER SUPPLY

(76) Inventor: Hui-Pin Liang, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/138,830

(22) Filed: May 6, 2002

(51) Int. Cl.$^7$ .................................................. H02J 7/00
(52) U.S. Cl. ........................................ 320/166; 307/109
(58) Field of Search ................................ 320/166, 126, 320/127, 137; 307/109, 110; 178/18, 19

(56) References Cited

U.S. PATENT DOCUMENTS

| | | | |
|---|---|---|---|
| 5,644,108 A | * 7/1997 | Katsurahira et al. | 178/18.07 |
| 5,724,028 A | * 3/1998 | Prokup | 701/36 |
| 5,764,402 A | * 6/1998 | Thomas et al. | 359/272 |
| 6,239,389 B1 | * 5/2001 | Allen et al. | 178/18.01 |
| 6,476,799 B1 | * 11/2002 | Lee et al. | 345/174 |

* cited by examiner

*Primary Examiner*—Lawrence Luk

(57) ABSTRACT

A wireless mouse induction power supply comprises a wireless mouse and a mouse pad. The wireless mouse is installed with a first induction coil which is connected to a first capacitor of a power supply circuit in parallel as an oscillating circuit. The oscillating circuit is connected to a charging capacitor through a diode. A second coil is embedded in the mouse pad; the second coil being connected to a power wire. When power is inputted into the second coil in the mouse pad for generating electromagnetic wave, the electromagnetic wave is received by the first induction coil in the wireless mouse. The induction coil will generate an electromotive potential so as to oscillate with the first capacitor; then the potential will charge the capacitor through the diode. Then, power is outputted to a transmitter in an interior of the wireless mouse; thereby, the wireless mouse remotely controlling a computer.

1 Claim, 5 Drawing Sheets

WIRELESS MOUSE INDUCTION POWER SUPPLY

FIELD OF THE INVENTION

The present invention relates to mouse devices, and particularly to a wireless mouse induction power supply, wherein a power supply is embedded in the mouse pad for supplying power to a wireless mouse or a charging seat is used to charge power to the wireless mouse.

BACKGROUND OF THE INVENTION

In general, a wireless mouse has a power supply which has two kinds: one is a battery in the internal of the wireless mouse for supplying power in transmission, the other is a charging seat wherein the mouse is powered in advance, such as the power supply of a mobile phone. However, the prior art has the following defects:

1. If a battery is used in the interior of a mouse, the battery must be updated frequently. This is inconvenient. Moreover, if no standby battery is prepared, the work must be stopped.
2. If a charging seat is used, the mouse must have two metal contact pieces at the surface of the mouse. In charging, the two metal pieces contact the two contact pieces on the charging seat. However, it is possible that the contact is not well so that the power can be charged into the mouse. Moreover, if the contact pieces are polluted, in a worse case, the power can not be charged.

SUMMARY OF THE INVENTION

Accordingly, the primary object of the present invention is to provide a wireless mouse induction power supply, wherein a power supply is embedded in the mouse pad for supplying power to a wireless power or a charging seat is used to charge power to the wireless mouse.

To achieve above objects, the present invention provides a wireless mouse induction power supply comprising a wireless mouse and a mouse pad. The wireless mouse is installed with a first induction coil which is connected to a first capacitor of a power supply circuit in parallel as an oscillating circuit. The oscillating circuit is connected to a charging capacitor through a diode. A second coil is embedded in the mouse pad. The second coil is connected to a power wire for supplying power. When power is inputted into the second coil in the mouse pad for generating electromagnetic wave, the electromagnetic wave is received by the first induction coil in the wireless mouse. The first induction coil will generate an electromotive potential so as to oscillate with the first capacitor of the power supply circuit. Then the potential charges the capacitor through the diode. Then, power is outputted to a transmitter in an interior of the wireless mouse; thereby, the wireless mouse remotely controlling a computer.

In the wireless mouse induction power supply of the present invention, the second coil is installed on a printed circuit board.

Another object of the present invention is to provide a wireless mouse induction power supply, wherein a battery can be connected with the capacitor in parallel, the battery provides power to the mouse when no mouse pad is supplied.

A further object of the present invention is to provide a wireless mouse induction power supply, wherein a charging seat is provided with a printed circuit board; a wireless mouse is placed on the charging seat; thereby, the charging battery being charged.

The various objects and advantages of the present invention will be more readily understood from the following detailed description when read in conjunction with the appended drawing.

DETAILED DESCRIPTION OF THE PREFERRED EMBODIMENTS

Figure 1:
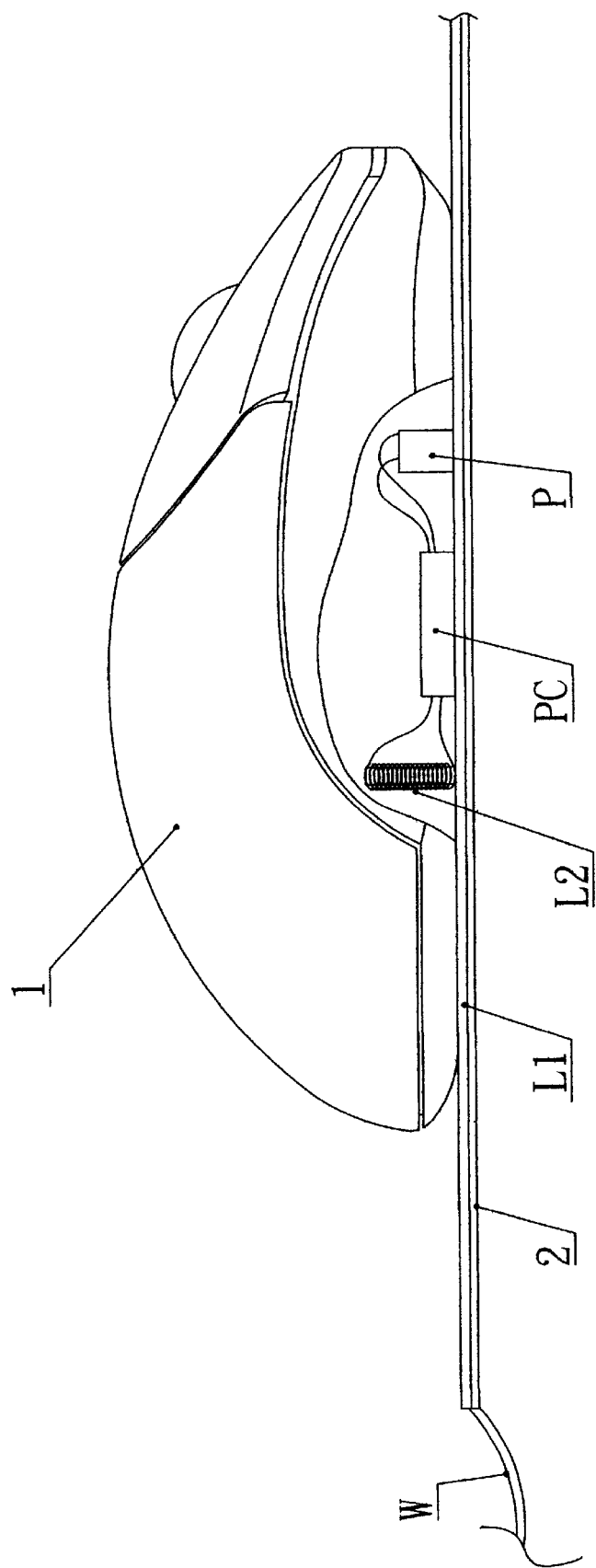
FIG. 1 is a partial cross sectional views of the wireless mouse and mouse pad of the present invention.
Figure 2:
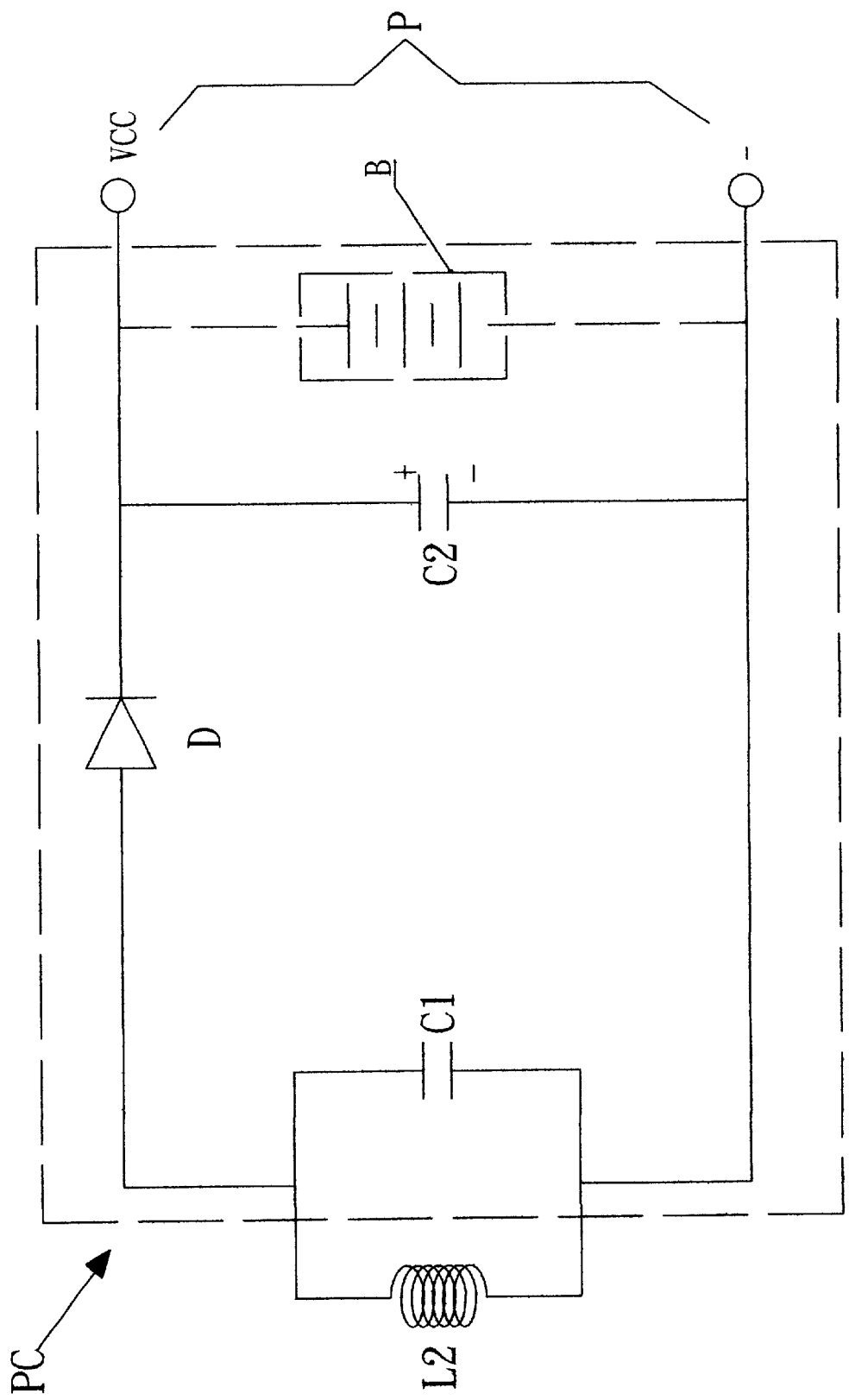
FIG. 2 is the schematic view of the charging circuit of the present invention.
Figure 3:
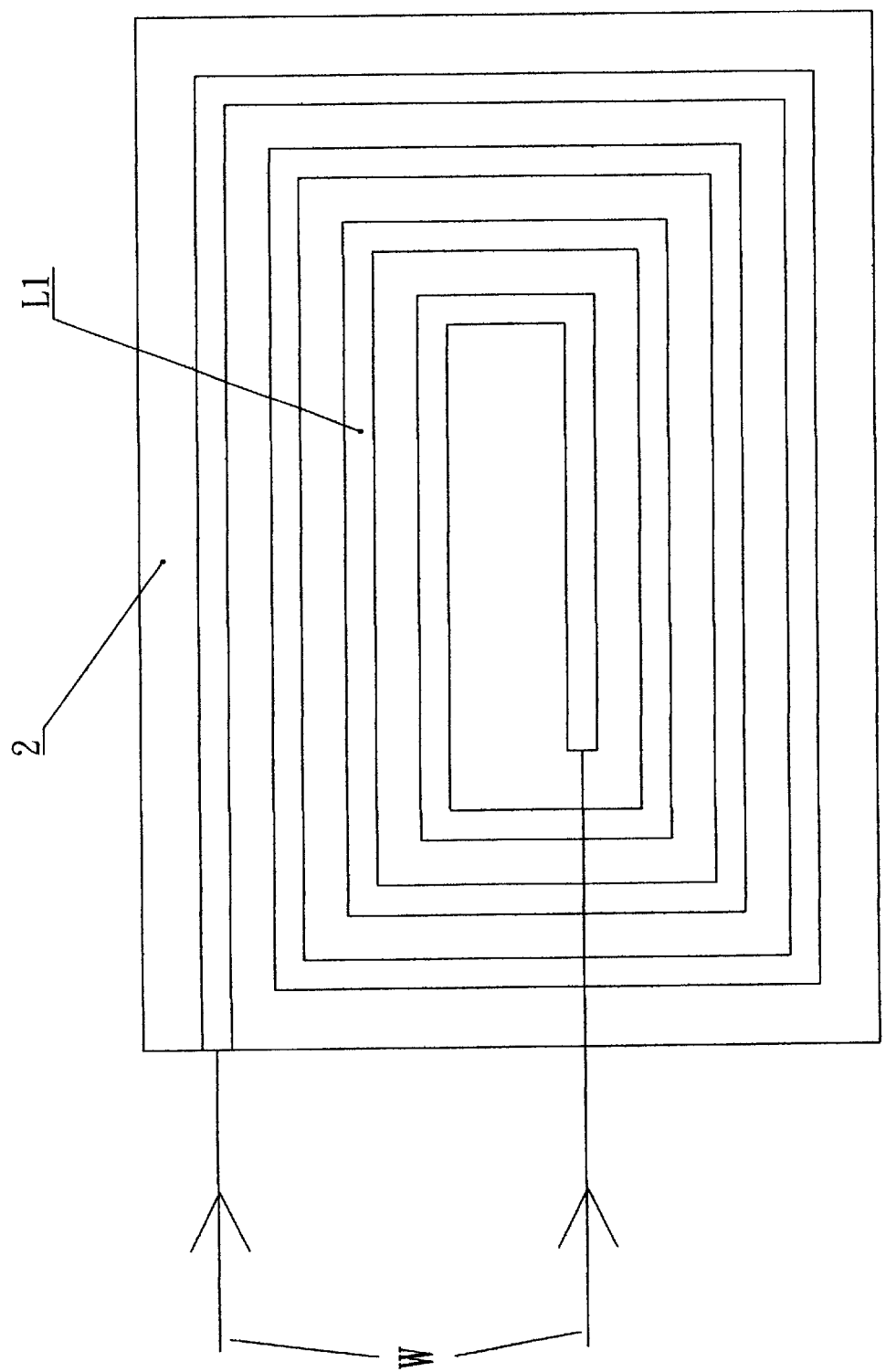
FIG. 3 is a schematic view showing the mouse pad of the present invention.
Figure 4:
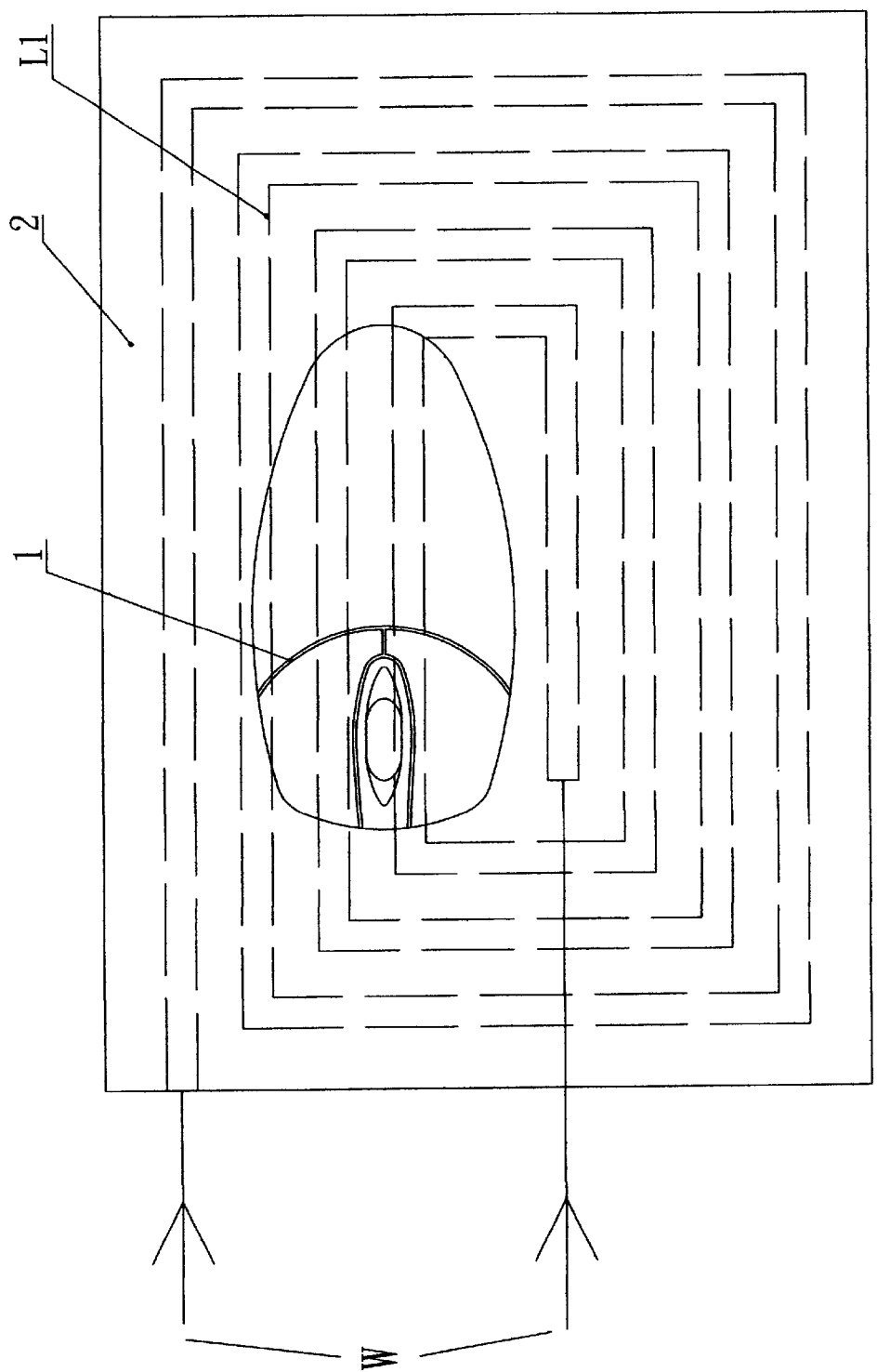
FIG. 4 shows one embodiment of the present invention, wherein the wireless mouse in placed on the mouse pad of the present invention.
Figure 5:
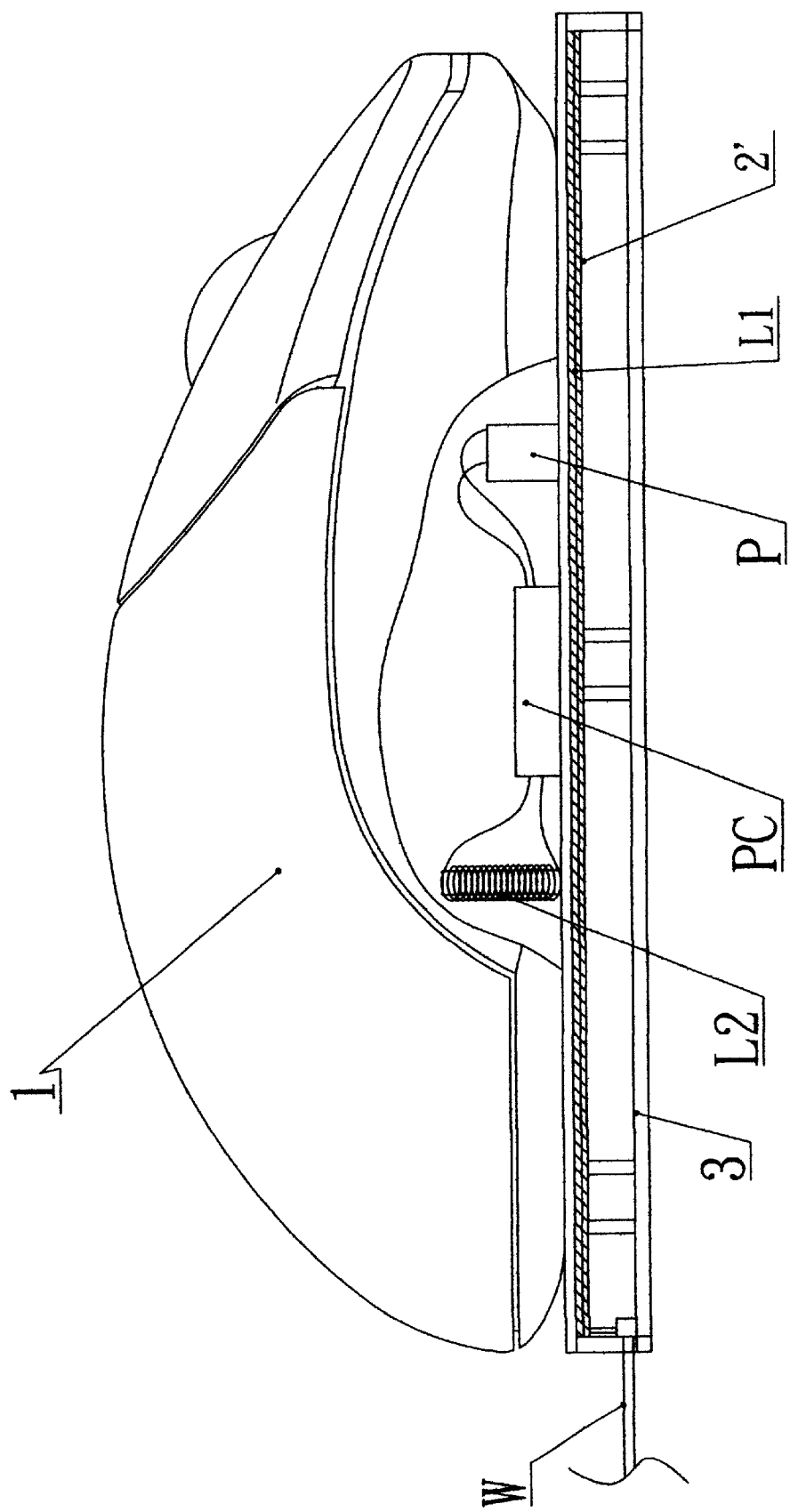
FIG. 5 is a schematic view showing the charging seat in another embodiment of the present invention.

With reference to FIGS. 1, 2 and 3, a bottom of an interior of the wireless mouse 1 is installed with an induction coil L2 which is connected to a capacitor Cl of a power supply circuit PC in parallel so as to form a parallel connected oscillating circuit. The oscillating circuit is connected to a charging capacitor C2 through a diode D so as to form an induction power supply circuit. Two ends of the charging capacitor C2 are connected with a working voltage which is matched the specification of a current used wireless transmission circuit. Signals are transmitted from a terminal P which is connected at two ends of the charging capacitor C2. In the mouse pad 2, a coil L1 is embedded in the mouse pad 2. A coil L2 is connected to a power wire W for supplying power. Referring to FIG. 4, when the wireless mouse 1 is placed upon the mouse pad 2, the coil L2 in the mouse pad 2 can be formed by a printed circuit board. When power is inputted into the coil L1 in the mouse pad 2 for generating electromagnetic wave, the electromagnetic wave is received by the induction coil L2 in the wireless mouse 1. The induction coil L2 will generate an electromotive potential so as to oscillate with the capacitor C1 of the power supply circuit PC. Then the potential will charge the capacitor C2 through the diode D. Then, power is outputted to a transmitter in the interior of the wireless mouse. Thereby, the wireless mouse can remotely control a computer. Thereby, the power of the wireless mouse will not be interrupted.

Moreover, when charging the capacitor C2, a battery can be connected with the capacitor C2 in parallel. As a result, the battery can provide power to the mouse when no mouse pad 2 is supplied.

Referring to FIGS. 2 to 5, in the present invention, a charging seat 3 can be provided with a printed circuit board 2' like the mouse pad with a coil. The wireless mouse of the present invention can be placed on the charging seat 3. Thereby, the charging battery B is charged.

The present invention is thus described, it will be obvious that the same may be varied in many ways. Such variations are not to be regarded as a departure from the spirit and scope of the present invention, and all such modifications as would be obvious to one skilled in the art are, intended to be included within the scope of the following claims.

What is claimed is:

1. A wireless mouse induction power supply comprising a wireless mouse and a mouse pad, characterized in that:

the wireless mouse is installed with a first induction coil which is connected to a first capacitor of a power supply circuit in parallel so as to form a parallel connected oscillating circuit; the oscillating circuit is connected to a charging capacitor through a diode so as to form an induction power supply circuit;

a second coil is embedded in the mouse pad; the second coil is connected to a power wire for supplying power;

when power is inputted into the second coil in the mouse pad and then electromagnetic wave is generated, the electromagnetic wave is received by the first induction coil in the wireless mouse; the first induction coil will generate an electromotive potential so as to oscillate with the first capacitor of the power supply circuit; then the potential will charge the charging capacitor through the diode; then, power is outputted to a transmitter in an interior of the wireless mouse; thereby, the wireless mouse remotely controls a computer; and the power of the wireless mouse will not be interrupted in use;

wherein the second coil is installed on a printed circuit board;

wherein a battery is connected with the charging capacitor in parallel, the battery provides power to the mouse when no mouse pad is supplied;

wherein a charging seat having a printed circuit board is provided; the wireless mouse is placed on the charging seat; thereby, the charging battery being charged.

* * * * *